INVENTOR.
Isao Sato
BY
 *(signature)*
attorney

Nov. 11, 1969　　　　　　　ISAO SATO　　　　　　　3,478,144
METHOD OF FORMING ENGRAVINGS ON THE CIRCUMFERENTIAL
SURFACE OF SYNTHETIC RESIN TUBES
Filed Oct. 12, 1966　　　　　　　　　　　　　　3 Sheets-Sheet 3

INVENTOR.
Isao Sato
BY
Ernest Montague
Attorney 3,478,144
METHOD OF FORMING ENGRAVINGS ON THE CIRCUMFERENTIAL SURFACE OF SYNTHETIC RESIN TUBES
Isao Sato, 20–50 Ban, Yamate-cho, Osaka Prefecture, Hiraoka, Japan
Filed Oct. 12, 1966, Ser. No. 586,123
Int. Cl. B29c 1/12, 1/14; B29g 1/00
U.S. Cl. 264—313     1 Claim

ABSTRACT OF THE DISCLOSURE

A method of forming engravings over the surface of a synthetic resin tube, which comprises the steps of inserting a synthetic resin cylinder into a molding member having a rugged surface on its inner circumference and inserting a removable resilient tube into the synthetic resin cylinder. A spherical body of a diameter slightly larger than that of the inner diameter of the resilient tube is forced to move in an axial direction within and successively along the inner circumference of the resilient tube, causing radial pressure to the synthetic resin cylinder and forcibly engaging the rugged surface of the molding member to form a rugged surface complementary to the rugged surface of the molding member to the outer circumference of the synthetic resin cylinder.

---

Figure 1:
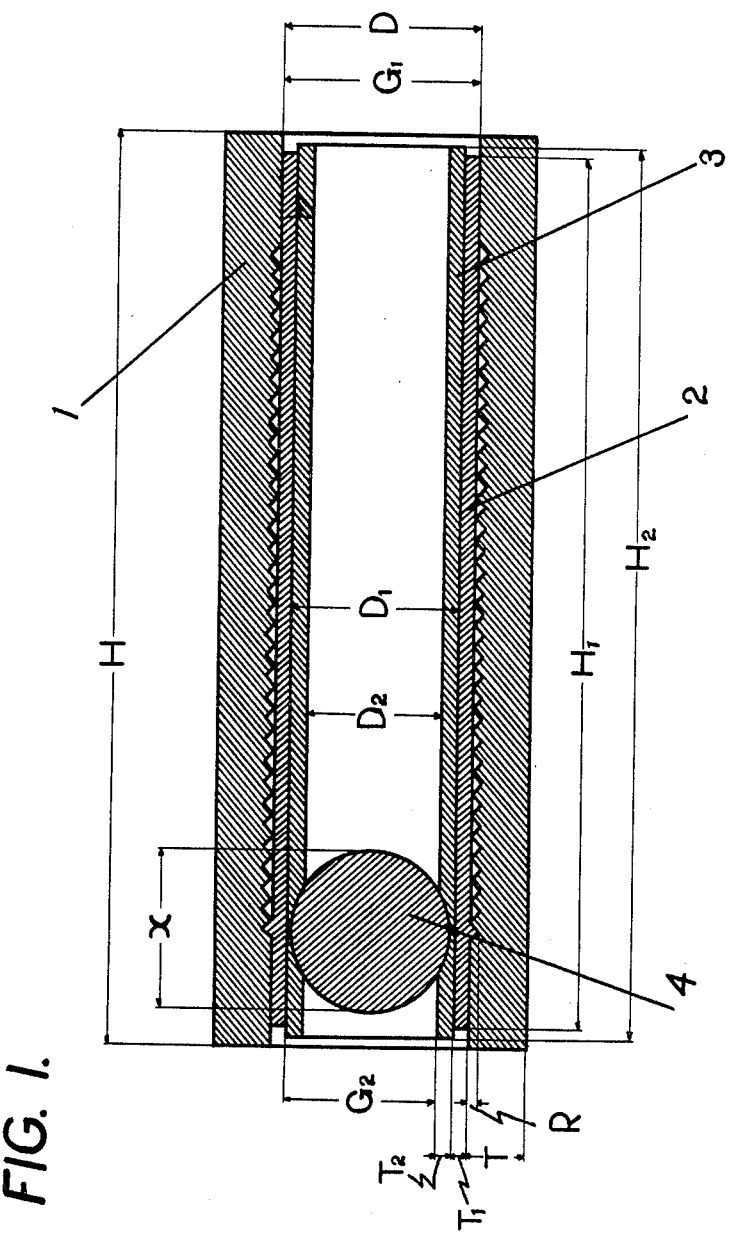

The present invention relates to a method for formnig engravings on the surface of a synthetic resin tube, more particularly, a method of forming engravings the circumferential surface of synthetic resin tubes used in winding various types of yarns by inserting a synthetic resin cylinder into a molding member formed with a rugged surface over its inner circumference and, if necessary, by inserting a resilient tube into the synthetic resin cylinder, while forcing a rubbingly movable member closely fitted with the inside of the resilient tube or the synthetic resin cylinder to shift within the tube or the cylinder and pressing the synthetic resin cylinder into contact with the rugged surface of the molding member so as to form a rugged surface over the outer circumferential surface of the synthetic resin cylinder.

In the conventional engraving method of this type, it has been a common practice to form a rugged surface either by carving concave and convex parts over the surface of the synthetic resin tube, or by subjecting the surface to corrosion, or by pouring synthetic resin into a mold formed with the concave and convex parts over the inner circumferential surface.

These conventional methods, however, can hardly be operated speedily as well as economically enough as they require finishing operations such as removing fins, necessitating cutting off the fins and making the operation and manufacturing process complicated at the same time.

It is one object of the present invention to provide a method of forming engravings on the circumferential surface of synthetic resin tubes, which overcome the above defects. A method is known, in which a rugged surface is formed over the outer face of a synthetic resin cylinder by inserting a pre-formed synthetic resin cylinder into a molding member formed with rugged surface over its inner circumference, while inserting a rubber tube into the synthetic resin cylinder, and then forcing the rubber tube to expand by means of oil pressure so as to force the synthetic resin cylinder into contact with the molding member. For the present, however, this method is far from being speedy and economical, because the synthetic resin cylinder is expanded at a stroke by means of oil pressure, which requires an extremely high pressure while applying an extremely high pressure to the rubber tube, so that the same rubber tube may be blown up or damaged before long, stopping the operation unless the rubber tube is replaced several times a day, and moreover, there is the risk for the operator to be covered with oil.

It is another object of the present invention to provide a method of forming engravings on the circumfrential surface of synthetic resin tubes which amounts to a further improvement of the just described known method.

Figure 2:
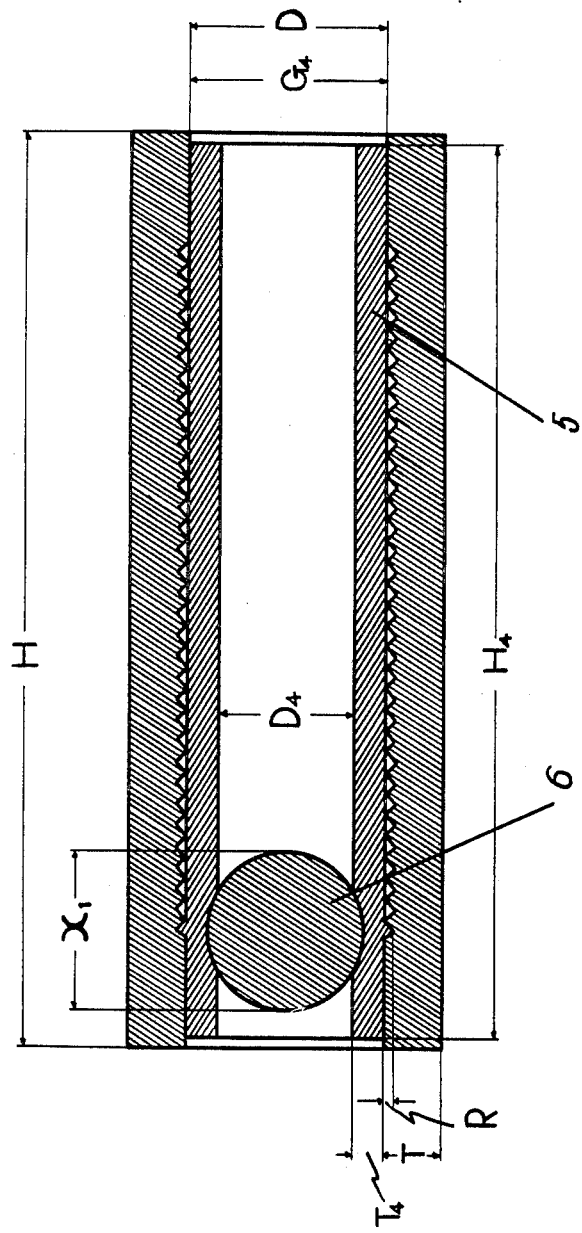
Figure 3:
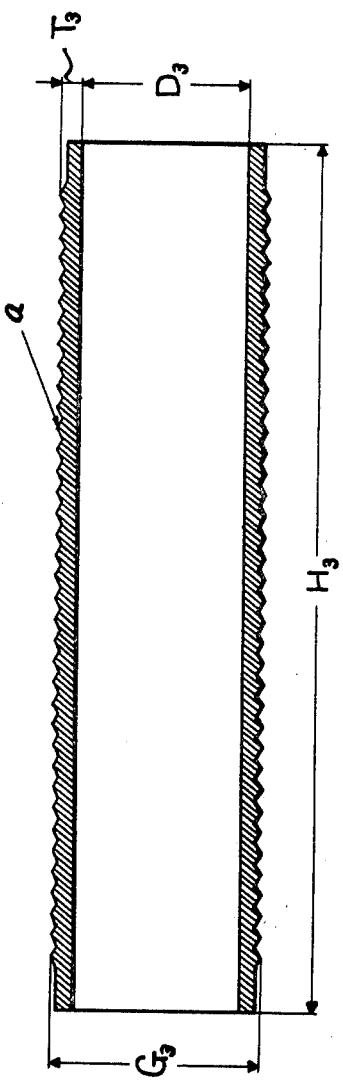
Figure 4:
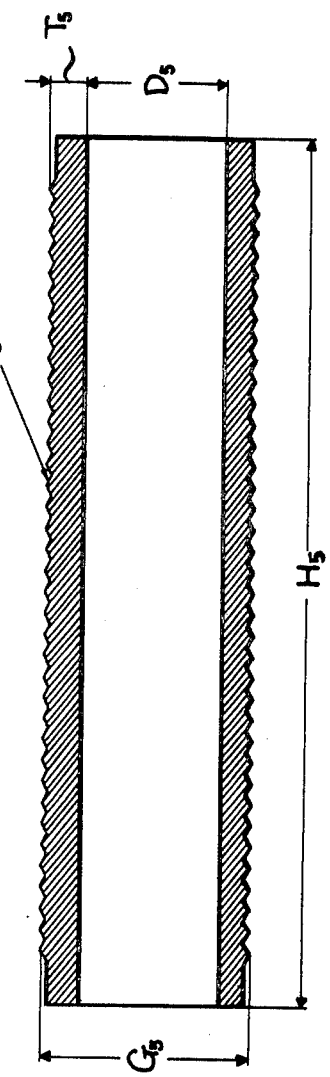

With these and other objects in view which will become apparent in the following detailed description, the present invention will be clearly understood in connection with the accompanying drawings, in which:

FIGURES 1 and 2 are schematic views of a vertical section showing the manufacturing process according to the present invention; and FIGURES 3 and 4 are front views of the vertical section of the resin tube obtained by the method of the present invention.

Referring now to the drawings, and in particular to FIG. 1, which discloses one example of the method embodying the present invention, its description is set forth as follows:

TABLE I (MOLDING MEMBER)

| | |
|---|---|
| Height (H) | 303 mm. or over. |
| Inside diameter (D) | Slightly larger than 44.1 mm. |
| Thickness (T) | As required. |
| Depth of groove (R) | 0.001–0.1 mm. |
| Number of grooves | 2–3 per mm. |

TABLE II (CYLINDER)

| | (Unit—m./m.) |
|---|---|
| Height ($H_1$) | 303 |
| Inside diameter ($D_1$) | 42.95 |
| Thickness ($T_1$) | 0.5 |
| Outside diameter ($G_1$) | 43.95 |

TABLE III (RUBBER TUBE)

| | |
|---|---|
| Height ($H_2$) | 303 or over |
| Inside diameter ($D_2$) | 32.95 |
| Thickness ($T_2$) | 5.0 |
| Outside diameter ($G_2$) | 42.95 |

TABLE IV

| | |
|---|---|
| Height ($H_3$) | 303 |
| Inside diameter ($D_3$) | 43.1 |
| Outside diameter ($G_3$) | 44.1 |
| Thickness ($T_3$) | 0.5 |

A cylinder 2 of A.B.S. (acrylobutadiene styrol) resin of the size as shown in the Table II formed by extrusion is inserted into a cylindrical heat molding member 1 of the size as shown in the Table I, which is provided with a hot wire (not shown) on its outer circumferential face, so as to heat its inner circumferential face to about 100° C., and, at the same time, a rubber tube 3 of the size as shown in the Table III is inserted into the A.B.S. (acrylobutadiene styrol) resin cylinder and then a spherical body 4 of the size of (X) (32.95+0.15—0.3) is closely fitted with the inside of the said rubber tube 3 and is forced to move within the rubber tube 3 by means of, for example, pushing force at the speed of 3–7 seconds.

Then, the A.B.S. (acrylobutadiene stylrol) resin cylinder 2 is forced into contact with the rugged surface R of the heat molding member 1 by the movement of the spherical body 4 so as to form a rugged surface over the outer circumference of the A.B.S. (acrylobutadiene styrol) resin cylinder, and a resin tube (a) as shown in FIG. 3 and of the size as shown in the Table IV is obtained.

As can be seen in FIGURE 3 the rubber tube is removed from the molded synthetic resin cylinder after the molding operation.

Then, referring to FIG. 2, the second example of the embodiment of the present invention will be described:

TABLE V (Unit—m./m.)

| | |
|---|---|
| Height ($H_4$) | 303 |
| Inside diameter ($D_4$) | 33.95 |
| Outer diameter ($G_4$) | 43.95 |
| Thickness ($T_4$) | 5 |

A cylinder 5 formed by extrusion of A.B.S. (acrylobutadiene styrol) resin of the size, as shown in the above Table V, is inserted into a heat molding member 1, such as the heat molding member 1 described in the first example, and a spherical body 6 of the size of (XI) (33.95+0.15−0.3) is closely fitted with the inside of the A.B.S. (acrylobutadiene styrol) resin cylinder 5 and is forced to shift within the cylinder 5 by means of, for example, pushing force at the speed of 3–7 seconds.

Then the A.B.S. (acrylobutadiene styrol) resin cylinder 5 is pressed into contact with the rugged surface R of the heat molding member 1 through the movement of the spherical body 6 so as to form a rugged surface R over the outer circumference of the A.B.S. (acrylobutadiene styrol) resin cylinder 5, and a resin tube as shown in FIG. 4 is obtained.

The method of the present invention consists of a spherical body having a diameter slightly larger than the inside diameter of the cylinder made of synthetic resin such as A.B.S. (acrylobutadiene styrol) or slightly larger than the inside diameter of the rubber tube inserted into the synthetic resin being moved in such a way as to apply pushing force to the inner surface of the cylinder or rubber tube so that the outer circumferential surface of the synthetic resin cylinder is pressed into contact with the inner circumferential surface of the heat molding member heated to about 100° C. Therefore, by means of a simple operation of shifting a spherical body within a rubber tube or a synthetic resin cylinder, the parts of the synthetic resin cylinder which are pressed into contact with the spherical body are pressed in turn into contact with the inner circumferential surface of the heat molding member until the same body is shifted from top to bottom and the operation is finished. The thin flashed ones may be used as covers over bobbins, while thick flashed ones may be used as bobbins for winding yarn on.

Further, according to the present invention, a synthetic resin cylinder pre-formed by extrusion is pushed by a spherical body and pressed into contact with a heat molding member heated to approx. 100° C. on its rugged surface of the inner circumference, therefore, the work is done by means of a very small scaled device as compared with the conventional method in which a synthetic resin tube is pressed by means of oil pressure. As, like the moving spherical body within, for example, the rubber tube shifts momentarily and partially, so as to push the inside of the rubber tube, the latter can withstand the pressure and will last long. Further, since the method consists of such a simple operation, as causing the spherical body to move, there is no risk due to oil pressure.

As stated above, the method of the present invention consists of forming engravings over the surface of a synthetic resin tube, and is highly effective for attaining the desired objects as initially stated.

While preferred embodiments have been described above in detail, it will be understood that numerous modifications might be resorted to without departing from the scope of the present invention, it is to be understood that these embodiments are given by example only.

I claim:
1. A method of forming engravings over the surface of a synthetic resin tube, comprising the steps of
   inserting a moldable synthetic resin cylinder into a molding member having a rugged surface on its inner circumference,
   inserting a resilient pressure yielding tube into said synthetic resin cylinder,
   forcing a spherical body of a diameter slightly larger than that of the inner diameter of said resilient pressure yielding tube to move in axial direction within and successively along the inner circumference of said resilient pressure yielding tube, successively radially expanding isolated portions of said resilient pressure yielding tube successively contacting said spherical body,
   causing successively in an axial movement radial pressure to said synthetic resin cylinder and forcibly engaging said rugged surface of said molding member to form a rugged surface complementary to said rugged surface of said molding member to the outer circumference of said synthetic resin cylinder, and thereafter removing said resilient pressure yielding tube from the molded synthetic resin cylinder.

References Cited

UNITED STATES PATENTS

| 382,417 | 4/1888 | Edison | 264—294 |
| 881,644 | 3/1908 | Winne | 264—313 X |
| 3,061,873 | 11/1962 | Supitilov. | |

FOREIGN PATENTS 367,948  3/1932  Great Britain.

ROBERT F. WHITE, Primary Examiner

N. RUSHEFSKY, Assistant Examiner

U.S. Cl. X.R.

18—16; 264—106, 249, 318